United States Patent

Schlieffers et al.

(10) Patent No.: US 6,745,943 B2
(45) Date of Patent: *Jun. 8, 2004

(54) HAND-HELD DATA ACQUISITION DEVICE

(75) Inventors: Joerg Schlieffers, Setauket, NY (US); Thomas K. Roslak, Eastport, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 237 days.

This patent is subject to a terminal disclaimer.

(21) Appl. No.: 10/016,165

(22) Filed: Nov. 1, 2001

(65) Prior Publication Data

US 2002/0104887 A1 Aug. 8, 2002

Related U.S. Application Data

(63) Continuation of application No. 09/255,584, filed on Feb. 22, 1999, now Pat. No. 6,394,355.

(51) Int. Cl.[7] .................................................. G06K 7/10
(52) U.S. Cl. ........................ 235/472.01; 235/462.45
(58) Field of Search ..................... 235/472.01, 462.45

(56) References Cited

U.S. PATENT DOCUMENTS

| | | |
|---|---|---|
| 5,335,170 A | 8/1994 | Petteruti et al. ............ 364/403 |
| 6,158,662 A * | 12/2000 | Kahn et al. ............ 235/472.01 |
| 6,234,395 B1 * | 5/2001 | Chadima et al. ....... 235/472.01 |
| 6,412,699 B1 * | 7/2002 | Russell et al. ......... 235/472.01 |
| 6,502,754 B1 * | 1/2003 | Bhatia et al. .......... 235/472.01 |
| 6,561,428 B2 * | 5/2003 | Meier et al. ........... 235/462.25 |

* cited by examiner

*Primary Examiner*—Karl D. Frech
(74) *Attorney, Agent, or Firm*—Ira J. Schaefer; Hogan & Hartson LLP

(57) ABSTRACT

A hand held terminal for optically scanning coded information has an electronic housing with a major axis, an intermediate axis and a minor axis. An optical scanning device is mounted at a first longitudinal end of the terminal with respect to the major axis. A multi-line information display is arranged on a top surface of the housing such that the display is facing in a direction corresponding to the minor axis. The terminal further has a handle with a handgrip extending outwardly from the housing at a second longitudinal end. The axis of the handle forms an angle of approximately 0 to 45 degrees from the major axis and is perpendicular to the intermediate axis. An operator control is arranged on said top surface adjacent the second end of said housing such that the control can be operated by the thumb on a hand grasping the device.

12 Claims, 9 Drawing Sheets

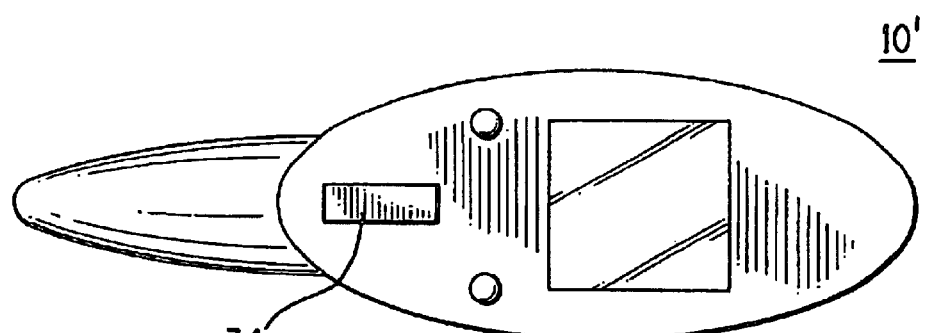
FIG. 3
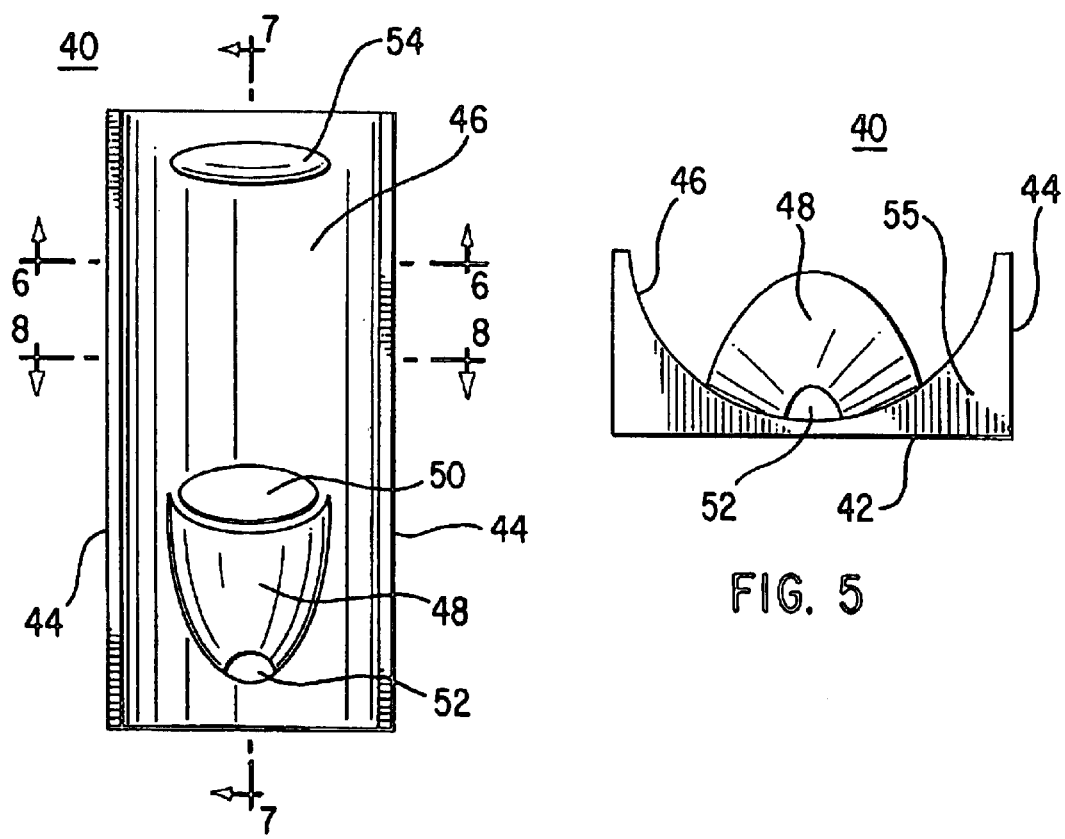
FIG. 4
FIG. 5

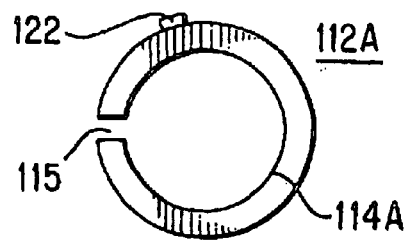
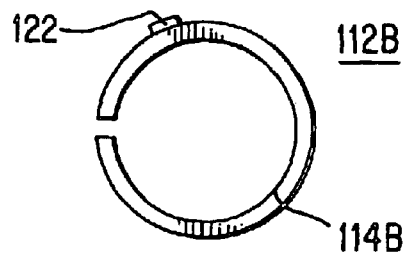
FIG. 13A   FIG. 13B
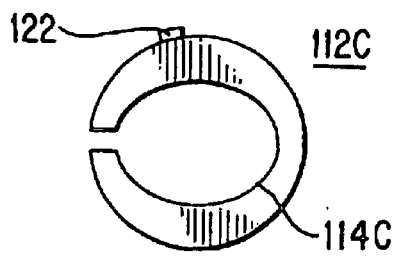
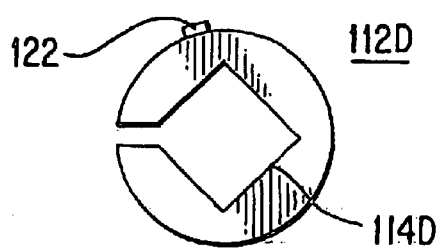
FIG. 13C   FIG. 13D
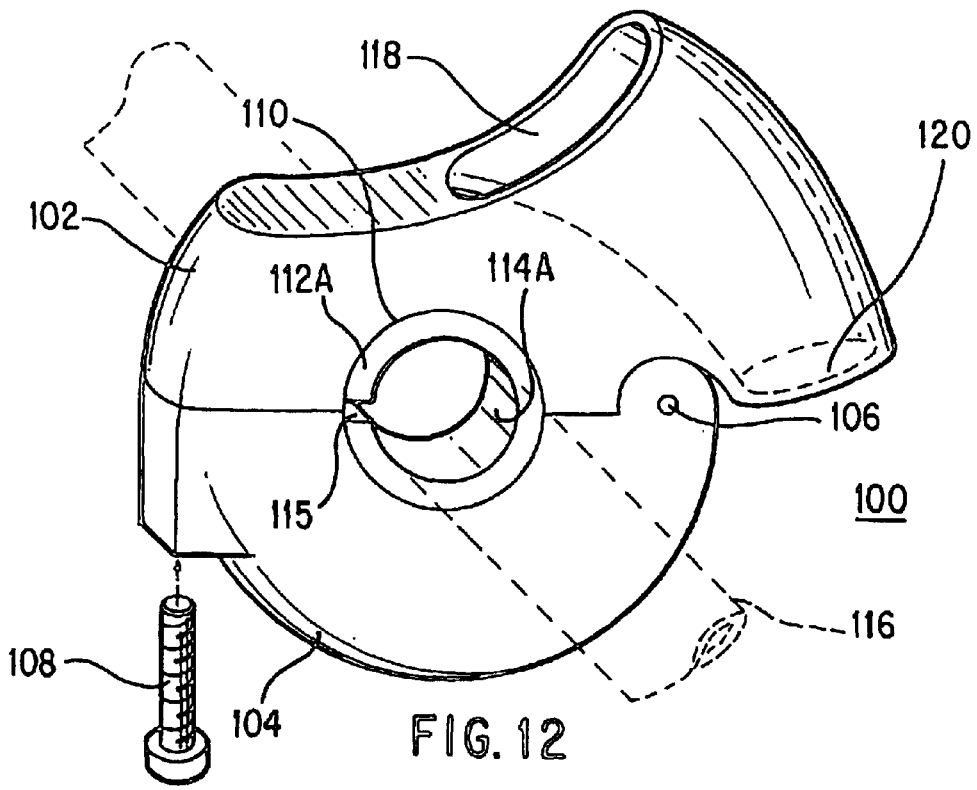
FIG. 12

HAND-HELD DATA ACQUISITION DEVICE

This application is a continuation application of application Ser. No. 09/255,584 filed Feb. 22, 1999 and now U.S. Pat. No. 6,394,355.

BACKGROUND OF THE INVENTION

The present invention relates to devices for optically acquiring data, and in particular to optical bar codes scanning devices.

Hand-held scanning devices are well known and used typically in connection with checkout stations at supermarkets and other retail establishments for reading bar codes on products being purchased by a customer. Such devices are also useful in connection with taking inventory and in connection with warehousing, shipping and storage of products. The assignee of the present application, Symbol Technologies, Inc., currently markets a Personal Shopping System wherein customers of a retail establishment can check-out individual product scanning devices, which are portable. During the customer's visit to the store, the customer scans products being purchased as the products are placed in the shopping basket. Product information acquired during the customers shopping is either stored in the portable terminal to be read out when the terminal is returned or relayed to a store computer by local area radio. When the customer has gathered all desired products, itemized checkout is not required since the products have already been scanned, and the device or central computer can be used to prepare a full list of the customers purchases and the price to be paid by the customer.

Currently used terminals for the Personal Shopping System tend to be rather large and bulky because of the inclusion of computer circuits, a bar code scanner, batteries, and in many instances a local area radio. In order to promote greater utilization of the Personal Shopping System and improved customer and merchant acceptance thereof, there is a recognized desire to provide hand-held terminals that are smaller in size, lighter in weight, more easily held and used by the customer and provide greater functionality. The present invention provides an ergonomically designed hand-held terminal which uses more compact and light-weight electronics and provides an improved and more comfortable shape for use by the customer. In addition, there is a desire to provide a convenient mounting receptacle at which the customers receives the terminals upon entering the store and an accessory for holding the terminal while shopping. The present invention, provides a new and improved cradle for receiving and dispensing hand-held terminals to customers.

SUMMARY OF THE INVENTION

In accordance with the invention, a hand-held terminal is provided for optically scanning coded information. In a preferred embodiment of the present invention, the terminal includes an electronic housing having a major axis, an intermediate axis and an minor axis. An optical scanning device is mounted at a first longitudinal end of the electronic housing with respect to the major access. A multi-line information display is arranged on a top surface of the electronic housing, facing in a direction corresponding to the minor axis. A handle is provided comprising a handgrip having a handle axis and extending outwardly from the electronic housing at a second longitudinal end thereof. The handle axis forms an angle of approximately 15 to 40 degrees from the major axis and approximately 75 to 50 degrees from the minor axis. The handle axis is perpendicular to the intermediate axis. An operator control is arranged on the top surface adjacent the second end of the electronic housing for operation by the thumb of a user. According to a preferred embodiment of the invention, the hand-held terminal is provided with a transverse rest stand on an end of the handle remote from the electronic housing. An electrical connector may also be provided at the remote end of the handle. The display is preferably recessed in the top surface to prevent damage thereto in the event the terminal is dropped. To further prevent damage to the terminal, the exterior facing surfaces of the electronic housing may comprise a resilient, impact-resistant material. An indicator lamp can be provided on the top surface of the electronic housing. A trigger is preferably provided on the handle adjacent the intersection of the handle with the electronic housing. The operator controls on the top surface may comprise buttons or in one embodiment, may comprise a touch pad or, in another preferred embodiment, a touch screen with software defined activated keys.

In accordance with the invention, there is further providing a cradle for receiving a hand-held terminal. The cradle includes a rectangular base having first and second side walls and a rear wall. A front wall comprising a concave cylindrical mounting surface, is arranged between the side walls. A pocket extends outward from the mounting surface for receiving a handle of a terminal with a housing of the terminal partially surrounded by the cylindrical mounting surface. In a preferred arrangement, the pocket is arranged at an angle with respect to the cylindrical mounting surface corresponding to the angle between the handle axis and the major axis of the electronic housing of the terminal. The pocket preferably includes an electrical connector for engaging an electrical connector on the handle of the terminal. The pocket preferably comprises an open upper end for receiving the handle and an substantially closed lower end. An opening is provided in the lower end for allowing debris to fall out of the pocket. The pocket may additionally include a locking member and there may be provided a locking circuit connected to an electrical connector in the pocket. The electrical locking circuit responds to an unlock signal provided to the electrical connector by a terminal. In one arrangement, at least a portion of the front wall is fabricated of translucent material and one or more lamps are provided behind the front wall, arranged to be activated by a lamp signal provided to the electrical connector by the terminal. This translucent wall may consist of a replaceable insert which may be modified to include location specific markings such as store names, location identifiers and/or product advertising. The cradle may further include a member extending outwardly from the concave cylindrical mounting surface and facing the pocket for supporting a optically readable label and for receiving a single card reader member.

In accordance with one preferred embodiment of the invention, there is provided a method for providing self-service terminals to shoppers in a retail establishment. The method includes inserting a terminal in a cradle, which cradle includes a locking circuit and an electrical connector for supplying power to the terminal and for receiving data communication from the terminal. The cradle preferably includes an optically readable label. The terminal is operated to read the label and communicate label data to a central computer by radio. In an alternative preferred embodiment, the method includes reading customer provided identification at either a customer station or at the terminal and communicating identification data to the central computer. The central computer is operated to verify the customer identification and to select a terminal for use by the customer. Thereafter a radio signal is sent from the central computer to the terminal and the terminal is operated to send data communications to the cradle by the connector, the data communications operating the locking circuit. The customer is notified of the selected terminal.

According to one method, the customer may be notified by illuminating a portion of the cradle. Alternately, or in addition, a message can be provided on a display screen and/or an audio signal may be activated.

In accordance with the invention there is provided an electronic assembly for the hand-held data acquisition terminal. The assembly includes a lower housing member having an upper opening and an upper housing member arranged to close the upper opening and including a display window. A chassis is arranged to be mechanically mounted between the lower and upper housing members. The chassis has upper and lower recesses, such that a display can be mounted in the upper recess of the chassis facing the display window and a first circuit can be mounted in the lower recess of the chassis. A second circuit is mounted to the chassis covering the lower recess and the first circuit mounted therein.

In a preferred arrangement one of the housing members includes a window at a longitudinal end thereof and an optical scanner is mounted adjacent to said window on a support bracket carried by the chassis. The support bracket may be mounted to the second window and include a non-conductive spacer. An antenna can be mounted on the non-conductive spacer on a side opposite the second circuit.

In accordance with a further aspect of the invention there is provided an accessory for a handle on a shopping cart. The accessory comprises a body member having a receiving portion arranged to receive a hand-held terminal. The accessory further includes a clamping member connected to the body member and arranged to provide clamping action with respect thereto. The body member and the clamping member define an intermediate bore for receiving the handle. Within the base there is provided an interchangeable cylindrical clamp spacer having a periphery corresponding to the cross-section of the bore and an internal cylindrical hole with a cross-section selected to closely surround the handle.

In a preferred arrangement the intermediate bore is circular and comprises semi-circular cylindrical recesses on the body member and the clamping member. The clamping member can be pivotably connected to the body member at a first side of the intermediate bore and connected to the body member by a clamping screw at a second side of the intermediate bore. The clamping spacer may include an axial slot.

In a preferred alternative embodiment, the terminal is provided with additional modular accessories such as a keyboard, mag-strip reader, a heads up display including audio speakers, microphone and/or video; electronic surveillance tag deactivators, smart card reader, touch sensitive display and/or voice over IP capability. These peripheral devices provide additional functionality for the terminal so that they may provide additional terminal functionality. For example, the terminals may function as inventory terminals, a checkout register, terminal assistants to shoppers who may be blind, hard of hearing or have other disabilities, or function as a manager's assistant terminal for retrieving audio/visual information from external locations. These peripherals, also referred to as a companion device, could be coupled directly through a communication port on the terminal or include a battery and transceiver to communicate with the terminal. In a further embodiment, the companion device includes a transceiver which is a radio which communicates directly with the same host network to which the terminal is coupled, but which is "associated" with the terminal by activating the peripheral device to communicate with the network scanning a special bar code on the peripheral device and thereby associating data entered on the peripheral device to the terminal.

For a better understanding of the present invention, together with other and further objects, reference is made to the following description, taking in conjunction with the accompanying drawings, and its scope would be pointed out in the appended claims.

BRIEF DESCRIPTION OF THE DRAWINGS

FIG. 3 is a top view of an alternate terminal embodiment.

FIG. 4 is a front elevation view of a cradle for the FIG. 1 or FIG. 3 terminal.

FIG. 5 is a bottom view of the FIG. 4 cradle.

FIG. 12 is a perspective view of a shopping cart accessory useable with the hand-held terminal of the present invention.

FIGS. 13A through 13D show interchangeable clamp spacers for use with the FIG. 12 accessory.

DESCRIPTION OF THE PREFERRED EMBODIMENT

Figure 1:
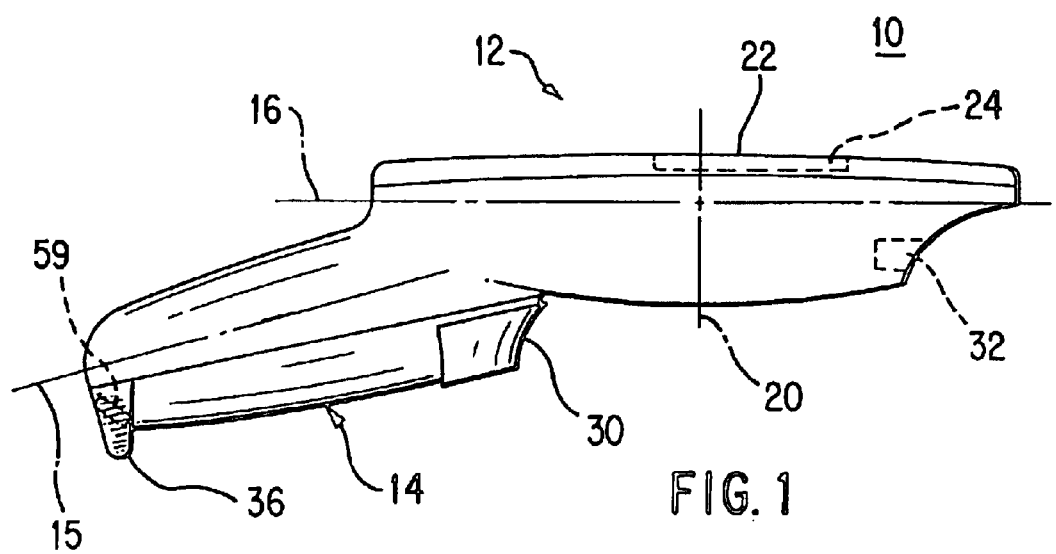
FIG. 1 is a side elevation view of a hand-held terminal in accordance with the present invention.
Figure 2:
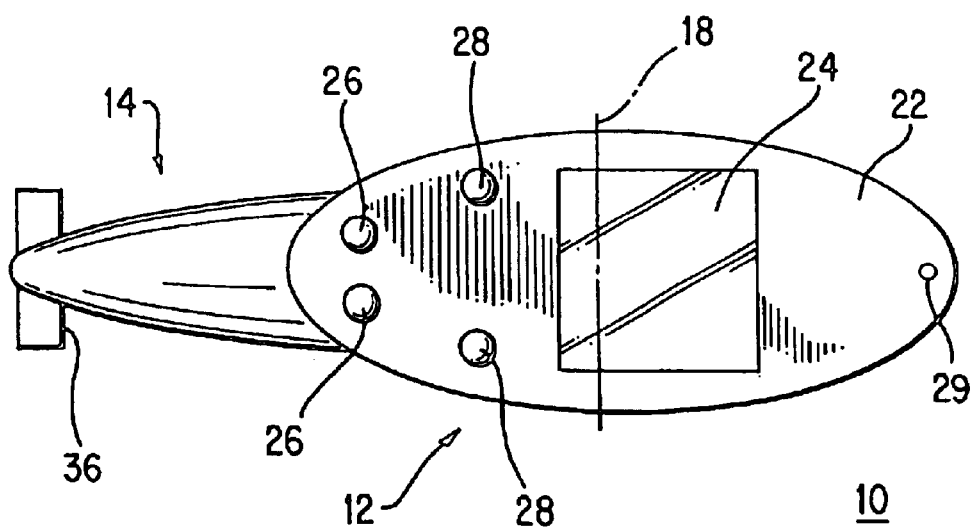
FIG. 2 is a top view of the FIG. 1 hand-held terminal.

Referring to FIGS. 1 and 2, there are shown side and top views of a preferred embodiment of a hand-held terminal 10 according to the present invention. Terminal 10 includes an electronic housing 12, which in the illustrated embodiment is ovoid in shape, having a major axis 16 along the length thereof, an intermediate axis 18 transversely across the housing, and a minor axis 20. A handle member 14 in the shape of a handgrip and having handle axis 15 extends from the housing 12. An optical bar code scanner 32 is mounted at a first longitudinal end of the ovoid electronic housing 12 with respect to the major axis 16 thereof. The handle 14 extends outwardly from a second longitudinal end of the electronic housing 12 opposite to the first end, with respect to longitudinal axis 16. Handle 14 has a handle axis 15 which extends at an angle of approximately 0 to 45 degrees from major axis 16 of the housing 12. Preferably the angle between handle axis 15 and major axis 16 is in the range of 15 to 30 degrees. The handle axis 15 forms an angle of 90 to 45, preferably 75 to 60 degrees with minor axis 20. In the preferred embodiment, axis 15 of handle 14 is perpendicular to intermediate axis 18 of housing 12. Handle 14 preferably includes a horizontal rest member 36, extending transversely at the end of handle 14 remote from housing 12. Rest member 36 also accommodates electrical connector 59 and provides an extending surface for engaging a locking member in the cradle, as will be described. Housing 12 includes a top surface 22 which includes a multi-line display 24, such as a pixel addressable liquid crystal display which could provide about eight lines of text and graphics, for displaying data and graphics to the user. Display 24 is preferably recessed into the top surface 22, as shown in FIG. 1, to provide protection from impact if the terminal is dropped. Preferably the outer surface of ovoid housing 12 is fabricated from an elastomeric resilient material, such as polycarbonate or ABS, to protect the electronic equipment from shock. Top surface 22 also includes control buttons 26 which are easily accessed by the thumb of a user while gripping handle 14. Additional buttons 28 are provided for performing functions which are less often required to be performed by the user, for example scrolling of the displayed information on screen 24. A trigger button 30 is provided on handle 14 near the intersection of handle 14 with electronic housing 12, for convenient use to trigger the scanning of an item by the user. An indicator lamp 29, such as a multicolor l.e.d., may be provided to indicate to the user that a bar code has been successfully read by the terminal.

An alternate arrangement for the hand-held data acquisition terminal 10' is shown in FIG. 3. Terminal 10' is similar to the terminal shown in FIGS. 1 and 2, except that buttons 26 are replaced with a touch pad 34, which is, of the type that may, for example, control scrolling of information on display 24, and also provide selection of functions or features. A suitable touch pad device is the touch pad used in connection with the GlidePoint device available from Alps Electric Company Limited of Japan. Alternatively, manual key activation could also be provided by a touch screen display having software defined user interface buttons which could be configured to provide user input commands. Alternatively, a thumbwell could be provided to scrool through various options and select a desired command or field. The thumbwell would have a rotating function for scrolling in one of two directions and be capable of pressing to select a specific selection once it is selected.

Figure 6:
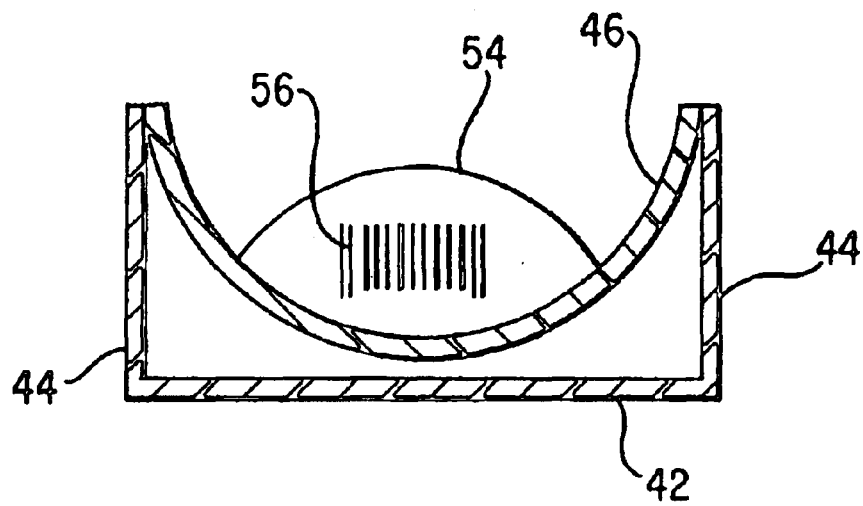
FIGS. 6 and 6A are a first cross sectional view of two alternative embodiments of the FIG. 4 cradle.
Figure 6A:
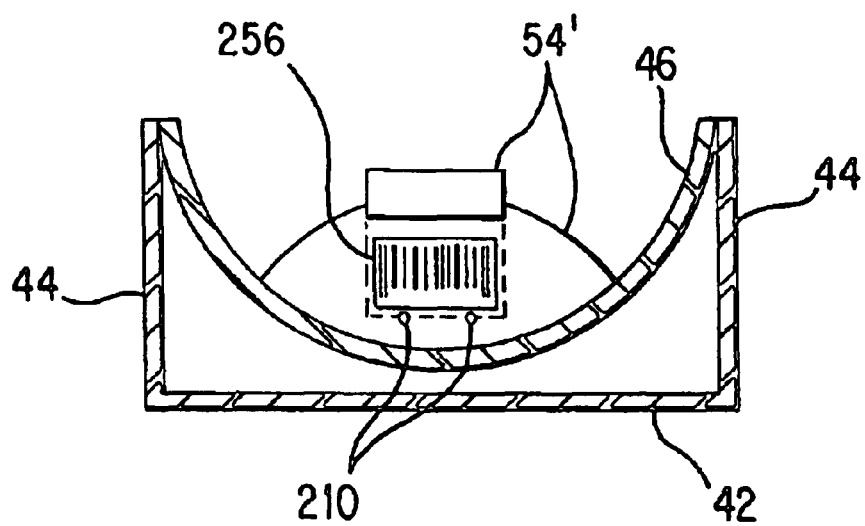
Figure 9:
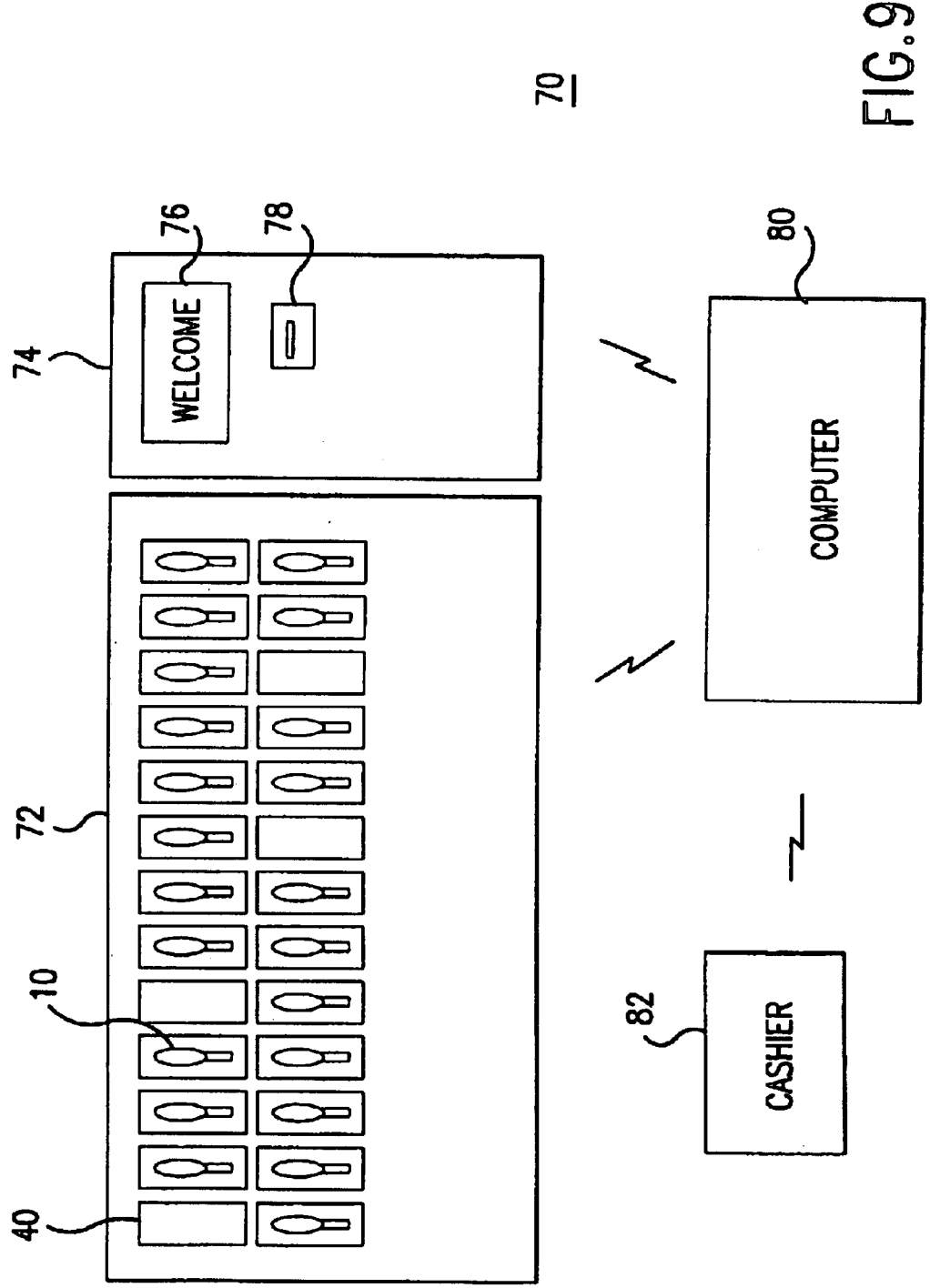
FIG. 9 is an illustration of a store dispensing system using the terminals and cradles of the present invention.

FIGS. 4 through 8 show a modular cradle 40 for holding and storing the portable terminal devices of FIGS. 1 through 3. The cradle 40 is modular to enable any number of cradles 40 to be mounted on a terminal dispenser in a rectangular grid, as shown in FIG. 9. Accordingly, cradle 40 includes a rectangular back wall 42 and side walls 44. Arranged between side walls 44 is a concave cylindrical surface 46. It should be understood that surface 46 need not be a circular cylinder, but can be any concave cylindrical shape, including without limitation an ellipse, parabola or multi-sided channel, for example. A pocket 48 extends outwardly from cylindrical surface 46 and incudes an upper opening 50 into which the handle 14 of terminal 10 may be inserted. For mechanical strength, pocket 48 may be mechanically mounted to back wall 42 and extend through a conformal opening in surface 46. With the handle 14 inserted in pocket 48, the electronic housing 12 sits at least partially within the recess formed by cylindrical surface 46 between pocket 48 and label-mounting member 54. A small opening 52 is provided at the lower end of pocket 48 to enable debris and other material that might accidentally enter the pocket to fall out through the bottom and not be retained therein. Modular cradle 40 may include top and bottom walls 54 to close the ends thereof, as is shown in the bottom view of FIG. 5. The cross sectional view of FIG. 6 shows label mounting member 54 which extends outwardly from cylindrical surface 46 at the upper end of the cradle 40. Member 54 provides a convenient location for placing a label 56 which is viewable by the optical scanning device 32 when terminal 10 is placed in cradle 40. Accordingly, terminal 10 can operate to read label 56, and by radio communication, notify a central computer 80 in which, of multiple cradles 40, terminal 10 has been placed.

Figure 7:
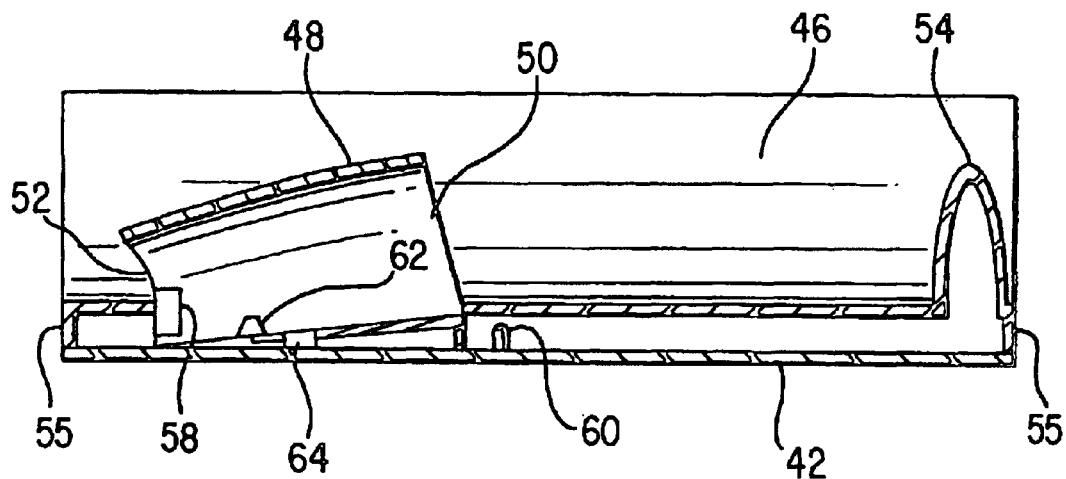
FIG. 7 is longitudinal cross sectional view of the FIG. 4 cradle.
Figure 8:
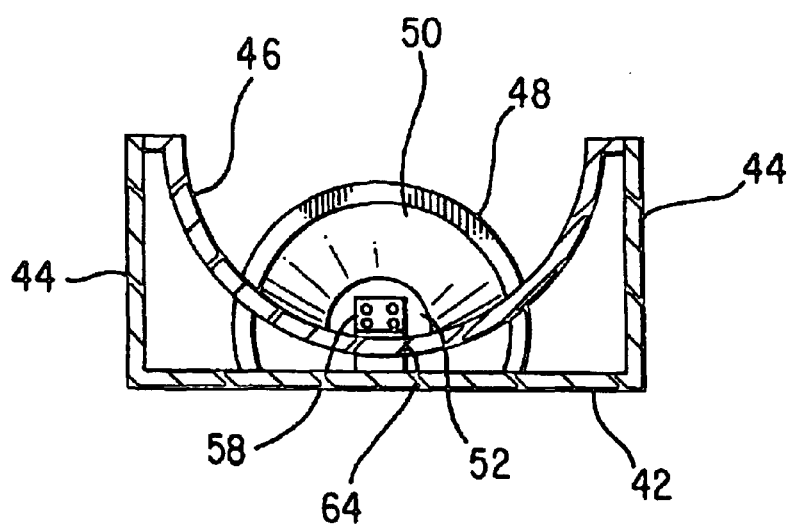
FIG. 8 is a further cross sectional view of the FIG. 4 cradle.

FIG. 7 is a longitudinal cross sectional view of cradle 40 showing label mounted member 54, end walls 55, and pocket 48. Pocket 48 is preferably at an angle with respect to mounting surface 46 corresponding approximately to the angle between the major axis 16 of housing 12 and handle axis 15, and preferably includes an electrical connector 58 which mates with a corresponding electrical connector 59 at the remote end of handle 14 of terminal 10. Using connector 58 power can be provided to terminal 10 when it is mounted in cradle 40, such as for the purpose of charging batteries therein. In addition, connector 58 can provide signaling connections for data communication between terminal 10 and the processor therein and circuits mounted on cradle 40. In particular, cradle 40 may include a locking mechanism 62 which is arranged to engage with rest member 36 on the remote end of handle 14 of terminal 10. The rest member could also be a groove for receiving the cord. Locking member 62 is operated by a locking circuit 64 which can unlock locking member 62 upon receiving a signal from terminal 10. The signal to unlock is originated by terminal 10 upon receipt of a command, such as by radio communication, from a central computer 80.

In one arrangement, the cylindrical surface 46 and optionally pocket 48 may be made up of translucent material. In this case, a light or lights 60 may be provided behind the translucent cylindrical surface 46. Such light can be activated to back-light the translucent cylindrical member and thereby signal to a customer which terminal is available and unlocked for his or her use. Lights 60 could also be used to provide notice of unit malfunction and/or low battery warning. Multicolor LEDs could provide a screen light illumination to signal a valid charged terminal and a red or orange LED could signal a malfunctioning unit.

In a preferred embodiment, member 54 of the cradle is a removable modular component which could be replaced with a member 54 for reading customer identification cards. The slot 201 would slidably receive a card 205 including a bar code 256 which identifies the customer. Upon insertion of the card, a card sensor 210 which is in communication with the terminal could be used to activate the terminal; otherwise the terminal's reader could be set in a blink mode to determine if a customer identification code is present without using an unnecessary amount of information. If so, the terminal would transmit the information to a host, obtain permission to be released and activate the terminal release mechanism and green LED lights on the cradle. A bar code 56 identifying the location of the cradle would also be placed in the opening which would be covered by an identification card placed into the slot 201. Such a system would obviate the need to provide an entrance head to the system or a central card reader and provides greater flexibility in locating the cradles throughout the facility.

Alternatively, the system could be employed during busy periods of terminal assignments as a means for assuring that the correct user is being permitted to retrieve the correct terminal. An alternative to the card sensor 210 could also be employed in that once a card is placed in front of the terminal bar code reader, the bar code reader could be activated by simply pressing on any of the keys exposed on the terminal. Alternatively, the terminal would be in a constant blink mode where it simply turns itself on every one or two seconds to determine if an authorized release bar code is present.

FIG. 9 illustrates the components of a self-service shopping system 70 using terminal 10 and cradle 40 according to the present invention. A customer service station 74 is provided which may include an identification card reader 78 and a display 76. The card reader could be a mag stripe reader, bar code scanner, retinal scanner or other form of user identification. Accordingly, the identification card could be replaced with a biometric user identification system. When a customer desires to check-out a self-service terminal 10, the customer inserts a machine readable identification device into card reader 78. Customer service station 74 sends the identification data from the identification device to computer 80 by radio or wired data communication. Computer 80 verifies the identification and selects one of terminals 10 for use by the customer. Computer 80 may also signal service station 74 to provide a message on display 76, such as "Welcome Ms. Jones, please use the terminal at position 5." Computer 80 may signal dispenser 72 to release the selected terminal, but preferably terminal release is controlled by a direct signal to the terminal itself, by radio data link. It should be understood that computer 80 selects terminals in rotation to provide uniform usage and to allow the terminals sufficient time for charging in dispenser 72, Where terminal release is controlled by radio signal to the terminal itself, dispenser 72 need only provide power to the individual modular cradles 40, thereby simplifying the arrangement for wiring dispenser 72.

When a terminal is selected for being dispensed to a customer, the customer may be advised in multiple ways. First, the display 76 may display a message to the customer indicating the cradle, e.g. by number, having the terminal assigned. Second, either a light 60 in the cradle 40 or a light 29 on terminal 10 can be caused to flash to attract the customer's attention. Finally, the customer's name may be displayed on the display 24 of the selected terminal.

Figure 14A:
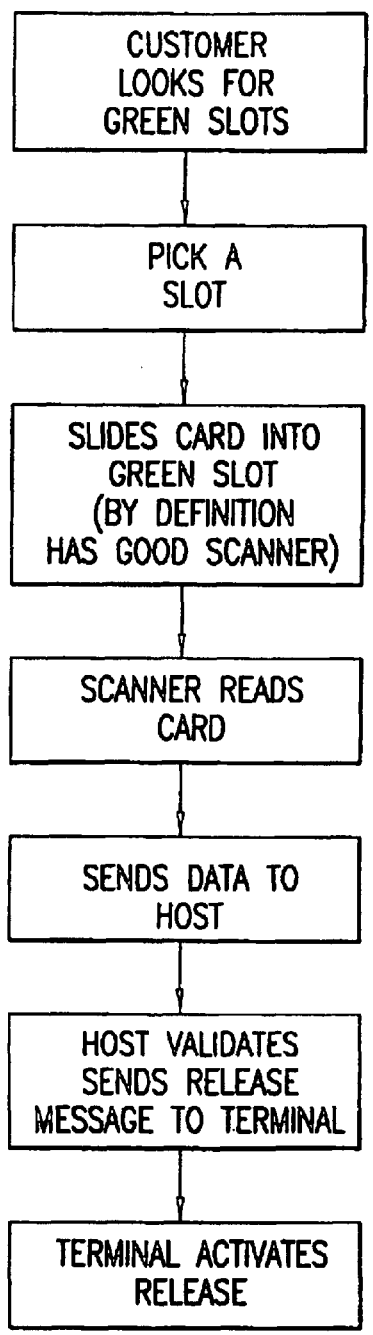
FIGS. 14A and 14B are flow charts of ISO methods for releasing locked terminals.
Figure 14B:
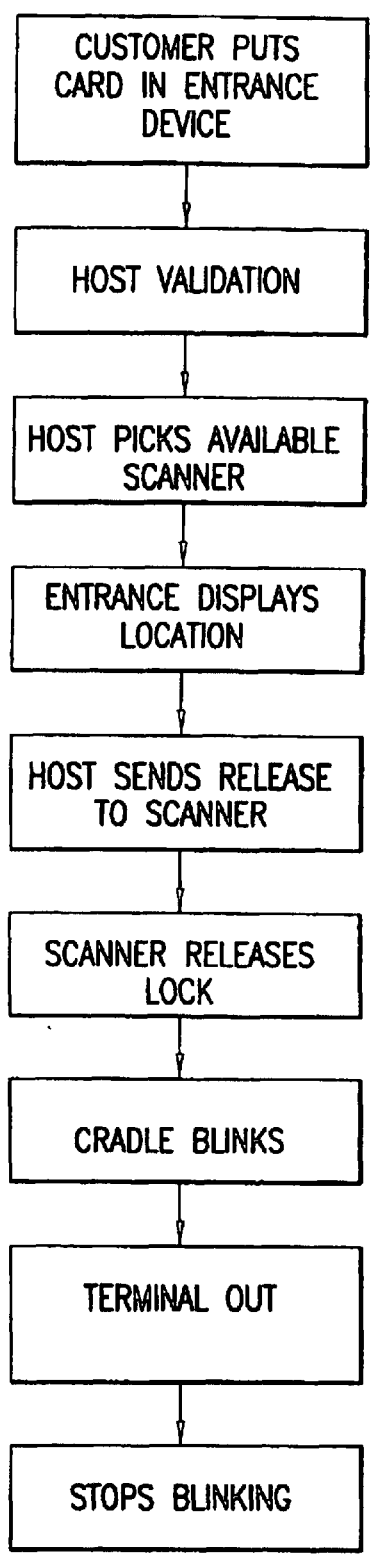

Two alternative methods of dispensing the terminals from the cradle are described in flow charts in FIGS. 14A–B.

During use of a terminal 10, data concerning items scanned by a terminal 10 can be supplied by radio link to computer 80 which will accumulate an item list for each customer. Alternately, the list may be maintained in a working memory of terminal 10, to be provided to computer 80 upon periodic radio polling, or when terminal 10 is returned to a cradle 40 in dispenser 72. If wired data connection to the terminals is provided in dispenser 72, the purchase data may be downloaded to computer 80 over a wired network. When the terminal 10 is returned to dispenser 72, the bar code reader 32 on terminal 10 may be automatically activated to read the bar code label 56 on cradle 40 to identify to computer 80 the position of that particular terminal in dispenser 72 and to signal a completed customer transaction (or place the transaction in a suspend mode so as to be completed at a checkout station or kiosk station upon payment and/or addition or deletion of items from the original list) and communicate such activity to a central host.

The data regarding a customer's purchases is provided by computer 80 by wire or radio link to a cashier station 82, where payment for purchased products can be collected and a receipt issued. Alternately, a printer may be provided to print the list to be carried to the cashier when a terminal is returned to dispenser 72. The list could be printed with a high density bar code such as PDF417 so that the list could be machine read into the cashier.

Figure 10:
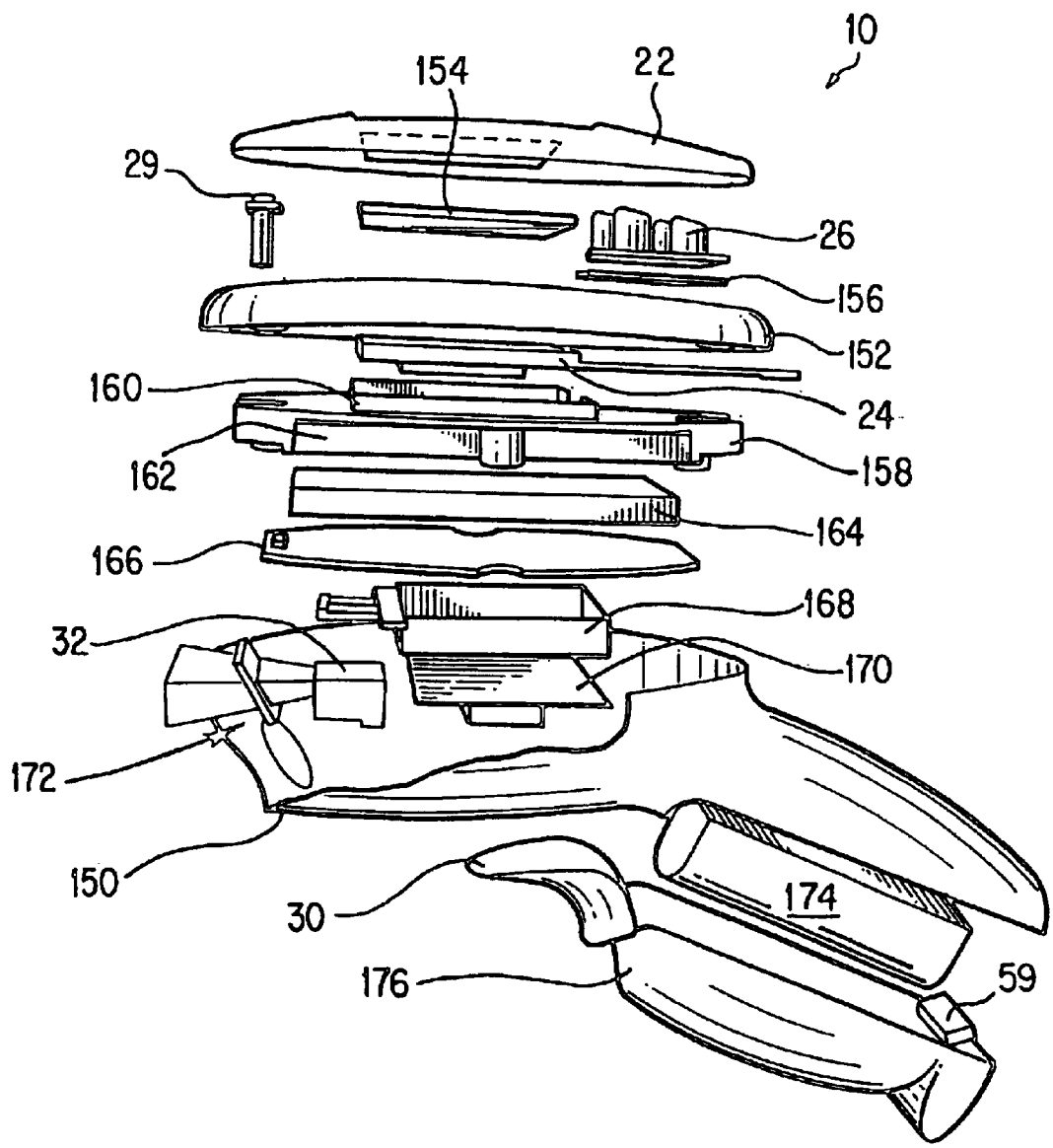
FIG. 10 is an exploded view of a hand-held terminal showing the arrangement of components in the electronic housing.

FIG. 10 is an exploded view illustrating a mechanical assembly technique for a hand-held terminal 10 according to a preferred embodiment of the present invention. The housing of terminal 10 includes a lower housing member 150 which is open on the upper side. The upper opening of housing member 150 is closed by an upper housing member 152. Upper housing member 152 has a recess in its upper surface which receives a button print circuit board 156, operating buttons 26 and a transparent window insert 154. The components on the recess of upper housing member 152 are retained by attachment of upper surface insert 22 to upper housing member 152. A light pipe 24, which conveys light from a light emitting diode on circuit board 166, may also be retained between upper housing member 152 and top surface insert 22. Top surface insert 22 maybe customized according to the desires of the system user, for example, a selected color may be used and displaying the logo of a supermarket chain or the like may be imprinted. A display circuit 24 is mounted in an upper recess 60 of a chassis 158 immediately below upper housing member 150 and adjacent a window opening in upper housing member 150, which is covered by transparent window 154. The lower side of chassis 158 has a further recess 162 which is arranged to receive a first circuit 154, which might, for example, be a compact radio circuit for transmitting data over a local area wireless network to a central computer. A second circuit 166 is mounted to chassis 158 on a lower side covering first circuit 164. Circuit 166 may include, for example, a microprocessor based computer circuit for operating and controlling the hand-held terminal and for storing and processing data acquired by the terminal. A mounting bracket 168 is mounted to the lower side of second circuit 166. Mounting bracket 168 is arranged to carry an optical scanner device 32 which is oriented to scan in a forward direction at a first lateral end of lower housing 150, for example, to acquire data by scanning bar codes. Bracket 168 can further act as a non-conductive spacer carrying antenna 170 at the lower side thereof, spaced from the conductive ground plane of second circuit 166.

Figure 11:
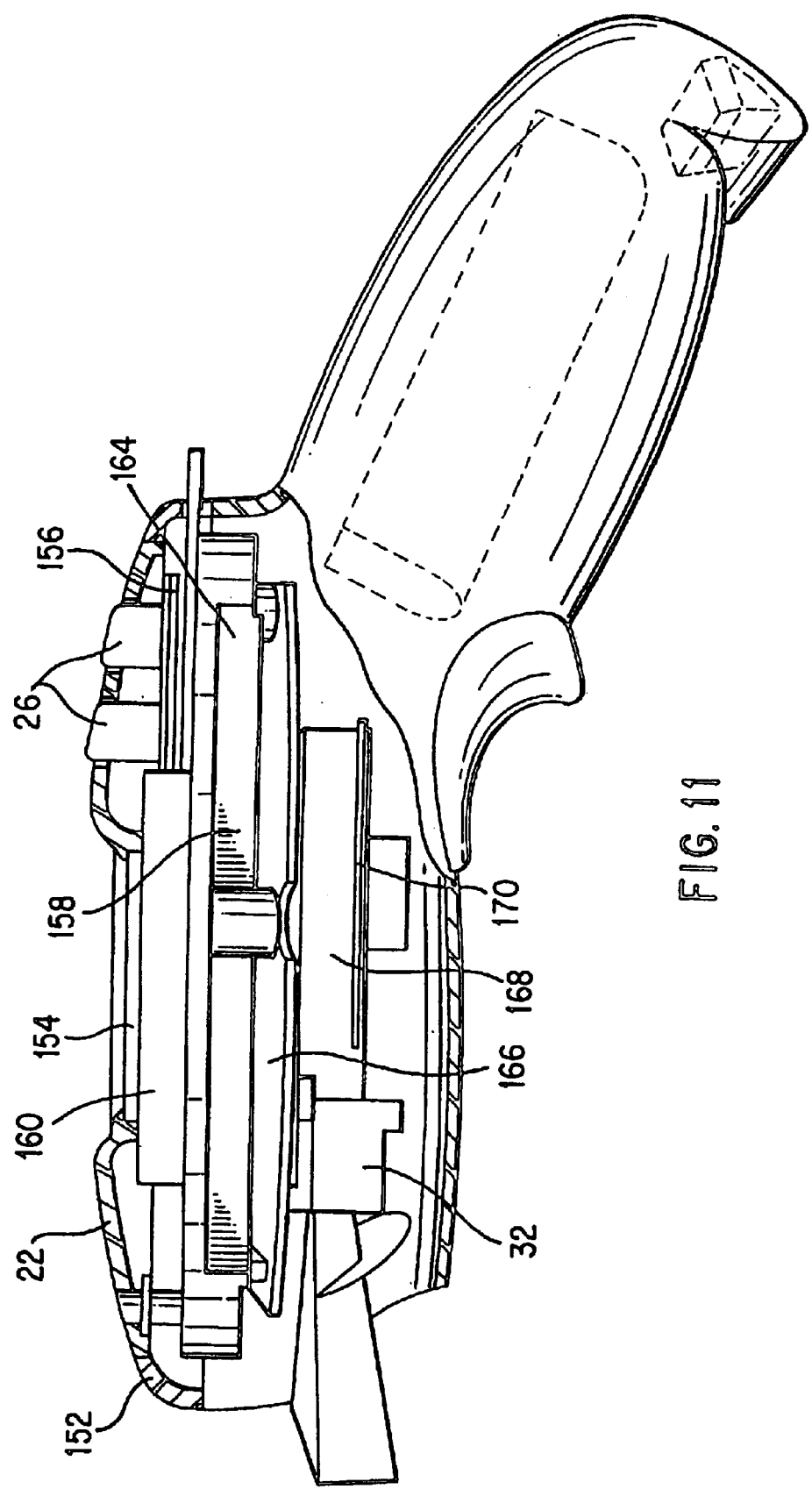
FIG. 11 is a cross-sectional view showing the assembled configuration of components in the electronic housing of a terminal in accordance with the invention.

The terminal of FIG. 10 is shown in its assembled cross-section configuration in FIG. 11. It will be recognized that the mechanical configuration of circuits and components shown in FIG. 10 and as assembly in FIG. 11 provides a highly compact terminal thereby enabling state of the art data acquisition terminal to be enclosed in a relatively small and ergonomical design configuration. Referring again to FIG. 10, it is shown that the handle portion of the terminal includes a trigger 30, battery 174 and a connector 59. A cover 176 provides access to the battery compartment within the handle portion.

FIG. 12 is a perspective view of an accessory 100 useful in connection with the hand-held terminal 10 of the present invention. Accessory 100 is designed to be mounted to the handle bar 116 of a shopping cart or similar device, such as a material cart used in a construction supply store. Accessory 100 includes a body 102 and a clamping member 104 which are movable with respect to each other. In the arrangement illustrated in FIG. 12 clamping member 104 is connected to body member 102 by a pivot connection 106. Clamping force between members 102 and 104 is provided by a clamping screw 108. Between members 102 and 104 there is provided an intermediate bore 110 which is in the form of a cylinder in the FIG. 12 embodiment. It should be understood that as used herein the terms cylinder, cylindrical bore and cylindrical hole are not confined to circular cylinders but include cylindrical extensions of other cross-sectional shaped, including square shapes and ovoid shapes, for example. Cylinder bore 110 in the illustrated embodiment is formed from a semi-circular cylindrical recess on body member 102 and an opposing semi-circular cylindrical recess on clamping member 104. An interchangeable clamp spacer 112A is provided within cylindrical bore 110 and has an internal cylindrical hole 114A with a cross-section selected to closely surround the handle 116 of a shopping cart. Clamp spacer 112A may include an axial slot 115 to accommodate compression of clamp spacer 112A between body member 102 and clamping member 104.

Body member 102 includes an extension forming an open end pocket 118 which is sized and arranged to receive the handle portion 14 of terminal 10. The lower end 120 of pocket 118 is provided with a small opening to prevent accumulation of debris in the pocket.

FIGS. 13A through 13D illustrates varying configurations 112A to 112D for the interchangeable clamp spacer. The outer periphery of clamp spacer 112 is sized to fit closely within intermediate bore 110 of accessory 100, and accordingly the interchangeable inserts have the same outer peripheral size. A protrusion 122 may be provided on the periphery of clamp spacers 112 to be received in a corresponding recess and prevent rotation of the clamp spacer 112 with respect to accessory 100 as illustrated in FIG. 13. Clamp spacer 112A has a circular central hole 114A. Clamp spacer 112B has a larger diameter internal circular hole 114B. Clamp spacer 112C has an ovoid cross-section internal cylindrical hole 114C. Clamp spacer 112D has a square cross-section internal cylindrical hole 114D.

While there have been described what are believed to be the preferred embodiments of the present invention, those skilled in the art will recognize that other and further modifications may be made thereto without departing from the spirit of the invention, and it is intended to claim all such changes and modifications as fall within the true scope of the invention. For example, the system could be modified to provide for a non-ovoid upper housing or to provide an IR port which shares space with the optical reader 32 so that a corresponding IR port could be placed on member 54 of the cradle 40 to provide for data communication between the terminal and the host. The bar code reader could also be a laser scanner such as the SE900 available from Symbol Technologies, Inc. or a CCD or CMOS type reader which does not employ laser scanning. In the event the system is to read other machine coded labels or tags, the bar code reader could also be replaced or accompanied by an appropriate reader such as an electromagnetic reader, RFID reader or EAS deactivation module. If the terminal is to work in an environment employing RFID tags, the radio used to communicate data to the host over the wireless network could also be employed to communicate to the RFID tag. In the event an antenna is required which is different from the radio's antenna, a focused antenna module could be placed in the place of the bar code reader so that it would be directed to the selected product and avoid reading non-selected tags.

What is claimed is:

1. A hand held terminal for optically scanning coded information, comprising:

an electronic housing having a major axis, an intermediate axis and a minor axis and an optical scanning device mounted at a first longitudinal end thereof with respect to said major axis;

a multi-line information display arranged on a top surface of said electronic housing, said display facing in a direction corresponding to said minor axis;

a handle comprising a handgrip having a handle axis and extending outwardly from said electronic housing at a second longitudinal end thereof, said handle axis forming an angle of approximately 0 to 45 degrees from said major axis and being perpendicular to said intermediate axis; and an operator control arranged on said top surface adjacent said second end of said electronic housing for operation by the thumb of a user on a hand grasping the handle;

wherein there is provided a transverse rest stand on an end of said handle remote from said electronic housing.

2. A hand-held terminal as specified in claim 1, wherein a width of the rest stand is substantially wider than a width of the handle at a point adjacent the rest stand.

3. A hand-held terminal as specified in claim 1 wherein an electrical connector is provided on an end of said handle remote from said electronic housing.

4. A hand-held terminal as specified in claim 1 wherein said display is recessed in said top surface.

5. A hand-held terminal as specified in claim 1 wherein exterior facing surfaces of said electronic housing comprise resilient, impact resistant material.

6. A hand-held terminal as specified in claim 1 wherein an indicator lamp is provided on said top surface of said electronic housing.

7. A hand-held terminal as specified in claim 1 further comprising a trigger on said handle.

8. A hand-held terminal as specified in claim 1 wherein said operator control comprises at least one button.

9. A hand-held terminal as specified in claim 1 wherein said operator control comprises a touch pad.

10. An electronic assembly for a hand-held data acquisition terminal comprising:

a lower housing member having an upper opening and a handle section;

an upper housing member arranged to close said upper opening and including a display window.

a chassis arranged to be mechanically mounted between said lower and upper housing members, said chassis having upper and lower recesses;

a display mounted in said upper recess of said chassis and facing said display window;

a first circuit mounted in said lower recess of said chassis; and a second circuit mounted to said chassis and covering said lower recess and said first circuit mounted therein.

11. An electronic assembly as specified in claim 10 wherein one of said upper and lower housing members includes a window at a longitudinal end thereof, and wherein there is provided an optical scanner mounted adjacent on a support bracket carried by said chassis.

12. An electronic assembly as specified in claim 11 wherein said support bracket is mounted to said second circuit and comprises a non-conductive spacer, and wherein an antenna is mounted to said non-conductive spacer on a side opposite said second circuit.

* * * * *